Jan. 26, 1971 C. J. PIERCE, JR 3,557,521

DEVICE FOR GROUPING RECEPTACLES AND ENCLOSING, GROUPED RECEPTACLES IN A WRAP-AROUND CARRIER BLANK, AND METHOD

Filed Jan. 8, 1968 13 Sheets-Sheet 1

INVENTOR.
Chester J. Pierce, Jr.

BY Howard E. Russell
his ATTORNEY

Jan. 26, 1971 C. J. PIERCE, JR 3,557,521

DEVICE FOR GROUPING RECEPTACLES AND ENCLOSING GROUPED RECEPTACLES IN A WRAP-AROUND CARRIER BLANK, AND METHOD

Filed Jan. 8, 1968 13 Sheets-Sheet 2

INVENTOR.
Chester J. Pierce, Jr.
BY Howard G. Russell
his ATTORNEY

INVENTOR.
Chester J. Pierce, Jr.
BY
Howard G. Russell
his ATTORNEY

INVENTOR.
Chester J. Pierce, Jr.
BY Howard G. Russell
his ATTORNEY

Jan. 26, 1971 C. J. PIERCE, JR 3,557,521

DEVICE FOR GROUPING RECEPTACLES AND ENCLOSING, GROUPED RECEPTACLES IN A WRAP-AROUND CARRIER BLANK, AND METHOD

Filed Jan. 8, 1968 13 Sheets-Sheet 5

INVENTOR.
Chester J. Pierce, Jr.

BY Howard G. Russell
his ATTORNEY

Jan. 26, 1971 C. J. PIERCE, JR 3,557,521

DEVICE FOR GROUPING RECEPTACLES AND ENCLOSING GROUPED RECEPTACLES IN A WRAP-AROUND CARRIER BLANK, AND METHOD

Filed Jan. 8, 1968 13 Sheets-Sheet 6

INVENTOR.
Chester J. Pierce, Jr.
BY
Howard G. Russell
his ATTORNEY

INVENTOR.
Chester J. Pierce, Jr.
BY
Howard G. Russell
ATTORNEY

INVENTOR.
Chester J. Pierce, Jr.
BY
Howard G. Russell
ATTORNEY

INVENTOR.
Chester J. Pierce, Jr.
BY
Howard G. Russell
his ATTORNEY

INVENTOR.
Chester J. Pierce, Jr.
BY
Howard G. Russell
his ATTORNEY

INVENTOR.
Chester J. Pierce, Jr.
BY
Howard G. Russell
his ATTORNEY

INVENTOR.
Chester J. Pierce, Jr.
BY Howard G. Russell
his ATTORNEY

INVENTOR.
Chester J. Pierce, Jr.
BY
Howard G. Russell
his ATTORNEY 3,557,521

DEVICE FOR GROUPING RECEPTACLES AND ENCLOSING GROUPED RECEPTACLES IN A WRAP-AROUND CARRIER BLANK, AND METHOD

Chester J. Pierce, Jr., Palo Alto, Calif., assignor to Certi-pak Corporation, New York, N.Y., a corporation of Delaware Filed Jan. 8, 1968, Ser. No. 696,475
Int. Cl. B65b *21/24, 11/10*
U.S. Cl. 53—48 9 Claims

ABSTRACT OF THE DISCLOSURE

The present improvements provide a small intermittently operating two-station machine for grouping at one station a group of receptacles and enclosing that group at a second station in a wrap-around type bottom closing carrier blank which is tightened around the group by a pair of blades which engage the folded blank at lateral relief openings immediately above the bottom structure through which openings the receptacles project after tightening. The blades tighten the blank to a position of maximum overlap of the overlapping bottom panels and raise the receptacles slightly from the bottom structure during tightening. The completed package may be ejected from the wrapping station by a pair of ejector blades having stepped ends for engaging the trailing carrier edge, the ejector blades moving together with, but in advance of, a reciprocating receptacle-grouping pawl.

BACKGROUND OF THE INVENTION

The multiple packaging of articles, particularly cans or bottles in groups in common wrappers or carriers requires packaging machinery which should match the output rate of the articles.

A large beverage plant, accordingly, employs one or several high speed packaging machines operating on the continuous flow principle in order to dispose of its output. Such machines are of necessity large, complex, and expensive.

There are, however, many beverage plants in existence of limited output operated by as few as two or three employees in a plant of relatively small floor space. The output of such small plants is adequately handled by a packaging machine of small capacity which should, however, be power-operated.

It is quite satisfactory for this purpose to provide a machine through which the receptacles pass in intermittent (sometimes called "stop-and-go") motion. The average rate of advance of the individual article, for example can or bottle, is relatively slow and, as a consequence, the machine can be made quite short, a length of from to five feet (120 to 150 cm.) being sufficient, measured from the point of arrival of bottles or cans to the point of discharge of loaded and locked carriers.

As far as I am aware, small packaging machines are known in which the receptacles are handled in three distinct stations. At a first station a group, for example four or six receptacles, are separated from the incoming supply. The group is then advanced to a second station at which a blank is combined with and folded about the group. Group and folded blank then proceed to a third station at which the ends of the blank are locked together by forcing locking tabs on one end into and through appropriate apertures in the other end of the blank.

The present improvements are based, in part, on the consideration that the machine structure can be made particularly short, and that the step-by-step feeding mechanism for the group can be greatly simplified by carrying out all operations in two stages, or at two stations, a first station at which a receptacle group is formed and a second station at which a blank is combined with the group, folded thereabout and locked, so that the complete package, i.e., paperboard carrier plus receptacles, emerges from the second station ready for loading into shipping cases.

Other aspects of the present improvements concern the mechanism for folding and tightening the wrap-around blank about the group, and for grouping and advancing individual receptacles, the group of receptacles and the completed package.

The invention is also concerned with an improved method of combining a wrap-around type blank with a group of articles so as to result in particularly effective tightening of the blank about the group, one aspect being that the tightening pull on the blank which is exerted by the blank folding mechanism is not relaxed, as it is in a three-station machine, prior to locking of the blank, and then that the group may be slightly lifted during the final tightening of the blank which results in the removal of slack of the blank.

In this regard the machine may employ principles set forth in the copending patent application of Normand L. Bertrand, Ser. No. 696,477, filed Jan. 8, 1968.

These and various other objects, features and advantages of this invention will appear more fully from the detailed description which follows accompanied by drawings showing, for the purpose of illustration, a representative embodiment of this invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages and the manner in which it may be carried out may be better understood by referring to the following description taken in connection with the accompanying drawings forming a part of it in which:

Drawings

Figure 1:
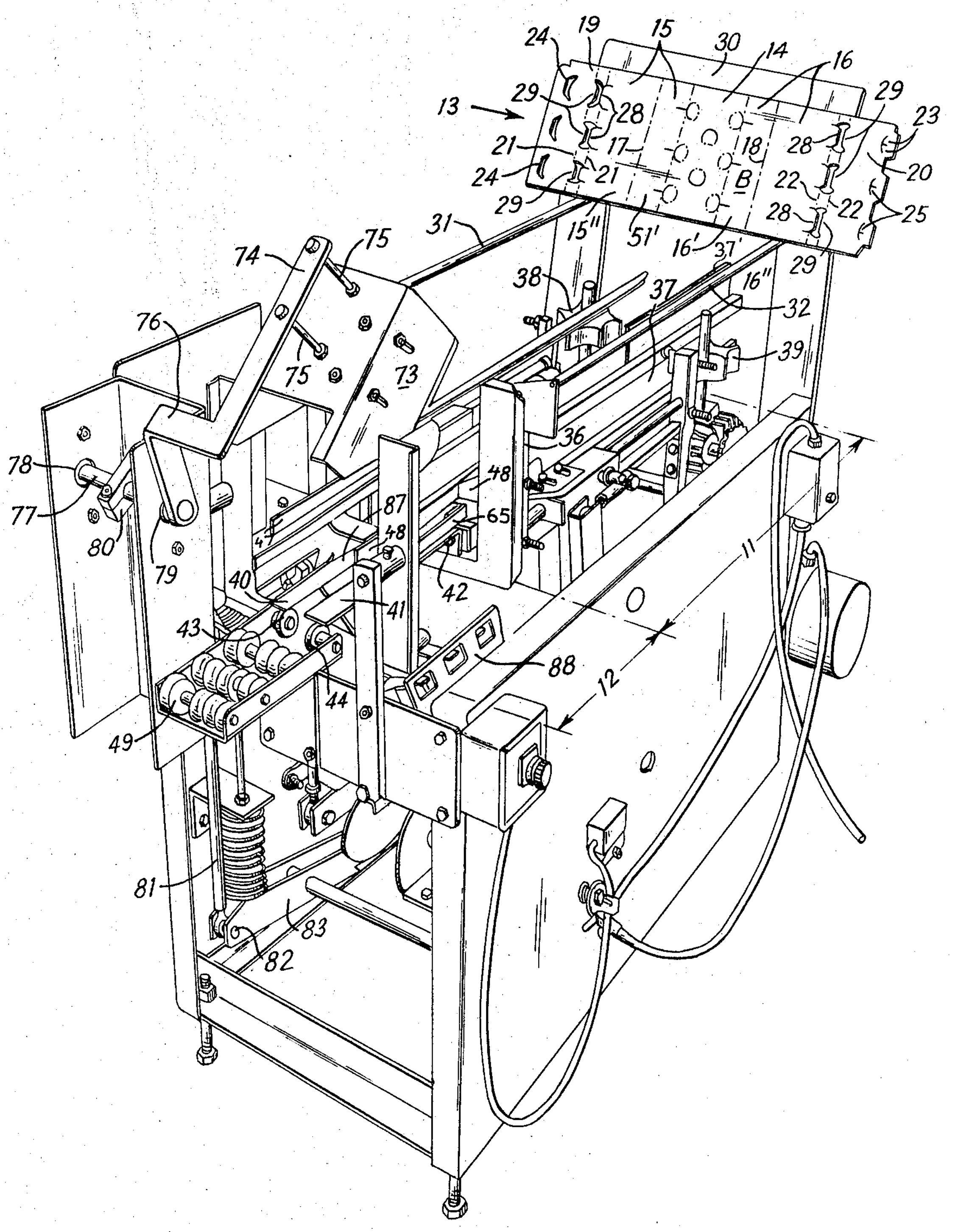
FIG. 1 is a perspective end view of a representative machine embodying the invention and arranged for hand feeding of the blanks.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention and that the invention may be incorporated in other structural forms than shown.

The principal zones or stations of the machine may be termed a grouping station 11 at which articles or receptacles arrive from a suitable point of supply to be grouped into packaging groups (which comprises six in the illustrated example) and a wrapping station 12 at which a blank B taken from a magazine 13 combined with and tightly fitted about the package group.

The illustrated machine is shown as handling bottles. It may also handle cans or other forms of receptacles such as jars. It should be understood that whatever is said in this description about bottles applies equally to other articles which the machine is capable of packaging. Therefore any and all reference to "bottles" is not to be taken in a limiting sense but is made for the sake of brevity to avoid the repetition: bottles or other receptacles such as cans, jars, etc.

Similar considerations apply to the blank which may differ in design from the blank shown in the drawings.

Blank

The illustrated blank B comprises a centrally disposed top panel 14 to which side panels 15 and 16 are articulated. The side panels 15 and 16 may optionally be subdivided into upper panel portions 15', 16' and lower panel portions 15'' and 16'' by folding scores 17 and 18. Bottom panels 19 and 20, are articulated to the side panels 15 and 16 along double folding scores 21, 22.

The bottom panel 20 has insertion tabs 23 formed on it which are insertable into slots 24 in the other bottom panel 19, as well as locking tabs 25 which are internally disposed and may be brought into locking engagement with slots 24, or more particularly with one edge thereof.

Within the zone of articulation of the bottom panels 19, 20 to the side panels 15, 16, as defined by the dual scores 21 and 22, relief openings 26, 27 are formed by pairs of cuts of concave curvature resulting in the formation of tabs 28 on the lower portions of the side panels and tabs 29 on the outer portions of the bottom panels.

It is readily seen that after folding of the blank B into carrier form the wall tabs 28 are downwardly pointed, whereas the bottom panel tabs 29 are outwardly directed.

For the purpose of practice of this invention the outwardly directed bottom tabs 29 are of primary importance, the wall tabs 28 could be absent. It is also readily seen that bottles enclosed in the carrier will rest above the bottom tabs 29 and that their bottom portions will protrude somewhat through the relief openings when the blank is drawn tight.

Magazine

The magazine of the illustrated machine is designed for manual withdrawal of blanks and comprises a slanted back plate 30 against which the blanks of a stack lean, the stack being supported on edge on rods 31, 32 which are threaded to prevent the blanks from sliding thereon.

It is manifest, however, that an automatic feeding mechanism may be employed for removing blanks, one by one, from the magazine and depositing them at the wrapping station.

The front ends of the rods 31 and 32 are secured to plates 33, 34 on posts 35, 36.

Receptacle track

A receptacle track extends centrally of the machine from one end to the other. Beginning at the far end of the machine as shown in FIG. 1, a single wide plate 37 extends from a point beyond two lateral star whels 38 and 39 to about the post 36 where the single plate 37 with a central divider plate 37' above it terminates and two supporting narrow plates 40, 41 begin. The far ends of the twin plates 40 and 41 are angled and bolted to the machine structure as seen at 42. The near ends are free and rest on rollers 43, 44. This represents a cantilever arrangement and permits withdrawal of the completed bottom structure of the carrier through a gap between the resilient plates and the supporting rollers, as will later be described.

Figure 2:
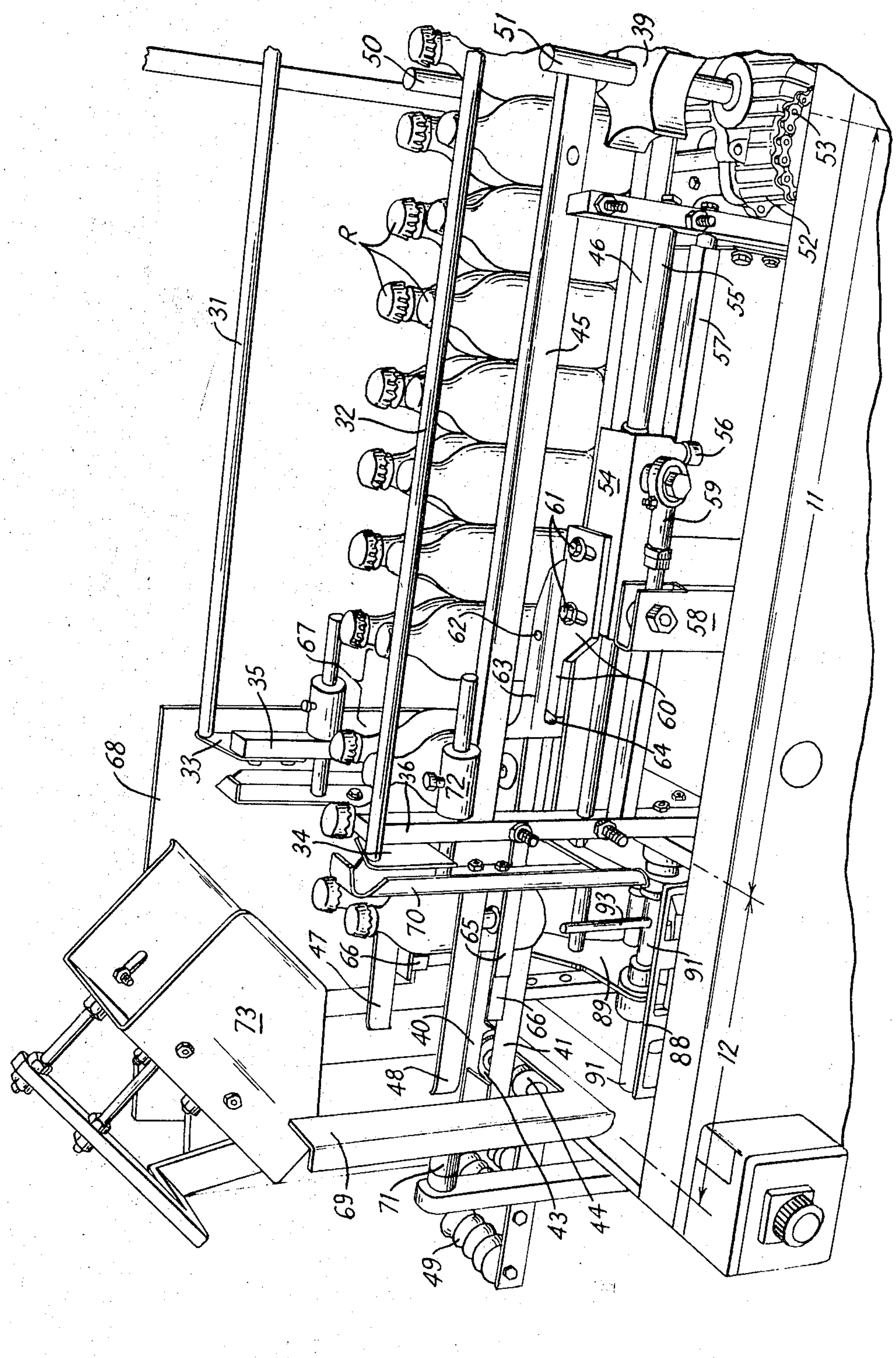
FIGS. 2 to 6 are perspective side views of the machine of FIG. 1 at successive stages of operation.

Returning to the far end of the receptacle track, and referring also to FIG. 2 in addition to FIG. 1, the track is laterally defined by upper and lower rails 45, 46 on each side. The rails keep the receptacles R on the track properly aligned when the receptacles are being pushed toward the wrapping station by the star wheels 38, 39.

Beyond the posts 35, 36 the lateral boundary of the receptacle track is formed by cantilever-mounted blades 47, 48.

No lateral boundaries are needed for the packaged receptacles which leave the wrapping station on a roller track 49.

Grouping mechanism

It may be stated at this point that the bottles R are supplied to the grouping station at the same rate, per time unit, as they are being packaged and discharged from the wrapping station.

For this purpose the star wheels 38, 39 are driven continuously or intermittently, depending on the rate of supply of blanks, the drive mechanism including vertical shafts 50, 51, angle gear boxes of which only one is visible at 52, and a chain 53.

The formation of bottle groups is accomplished basically by a pair of lateral pawls which click past a group of bottles, such as four or six, and then push the group formed at a rate faster than the steady linear rate of advance of the bottles produced by the star wheels, thus producing a gap behind the group.

The elements for accomplishing this are identical on both sides of tht machine. It will therefore suffice to limit the description to the mechanism on the near side of the machine.

A carriage 54 is mounted for reciprocating motion on a rod 55 and is guided against tilting on the rod 55 by rollers 56 which engage opposite sides of a square bar 57. A downwardly extending oscillating arm 58 drives the carriage 54 back and forth by means of a drive link 59.

A contoured mounting plate 60 is bolted to the carriage 54 at 61 and carries on its rearward portion the pivot 62 of a spring-urged pawl 63. The pawl is slotted for this purpose at 64 for additional guidance on the plate 60.

The front portion of the plate 60 carries an ejector blade 65 whose forward end is stepped at 66, for example by milling, the step facing the outside.

Figure 4:
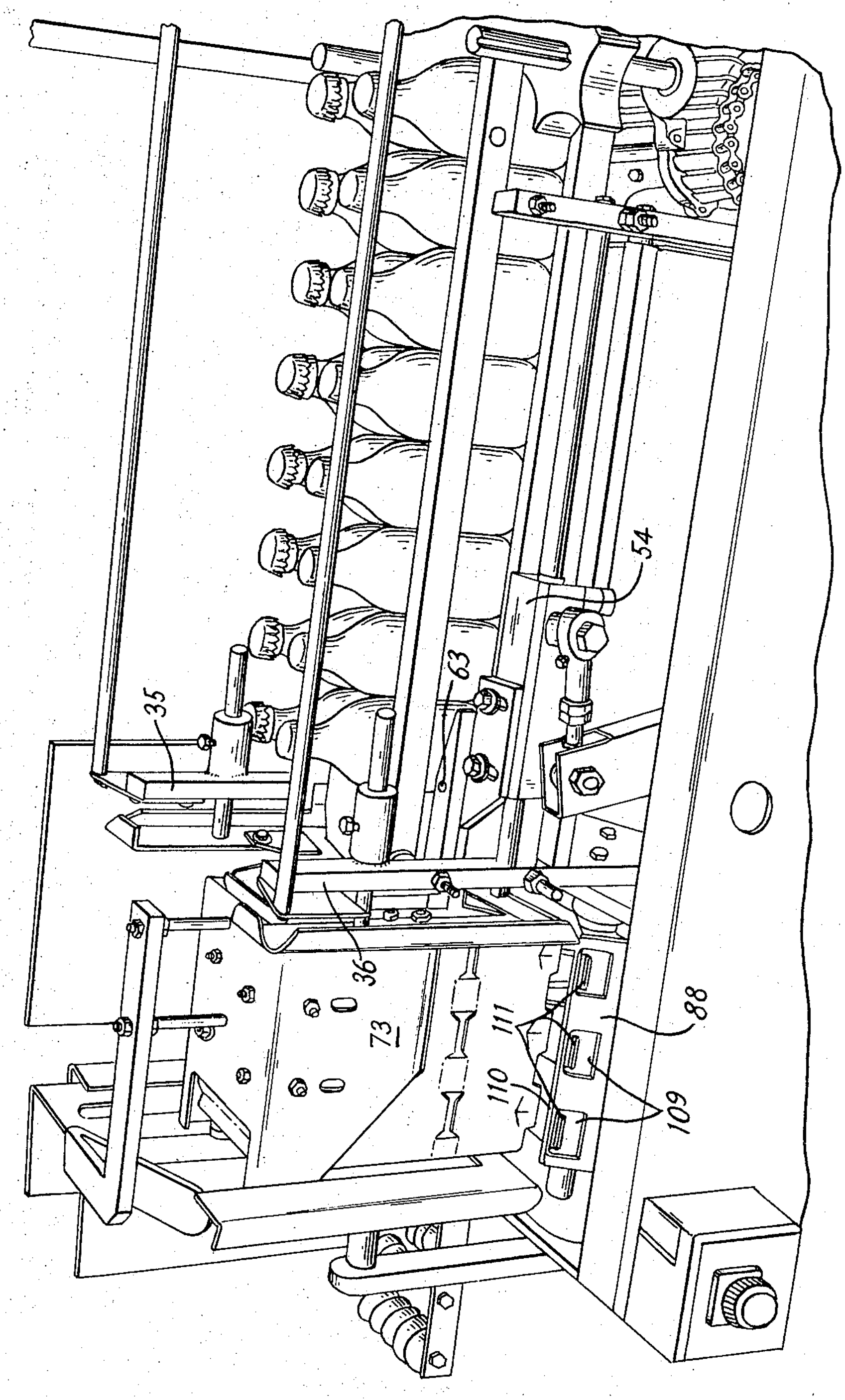
Figure 5:
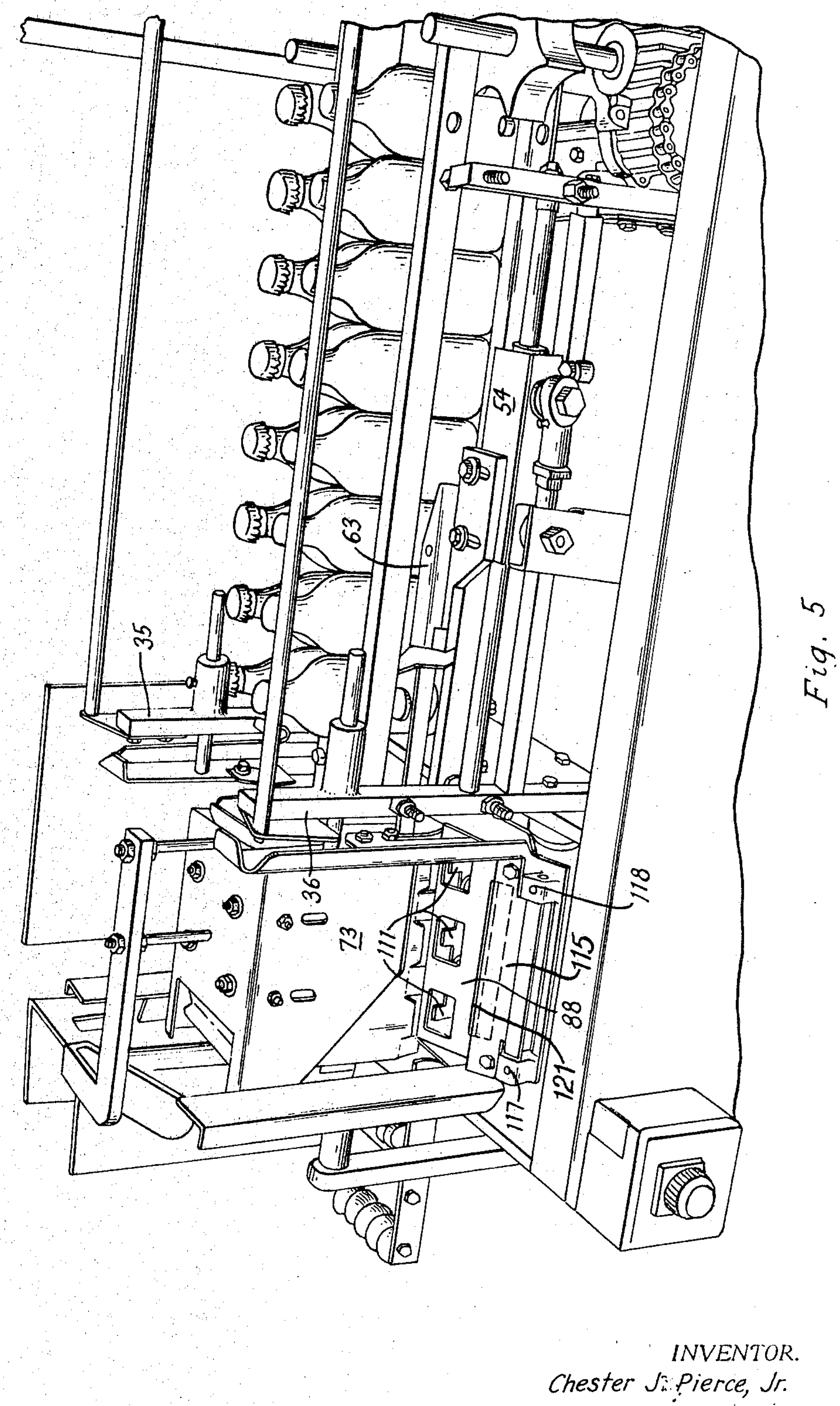
Figure 6:
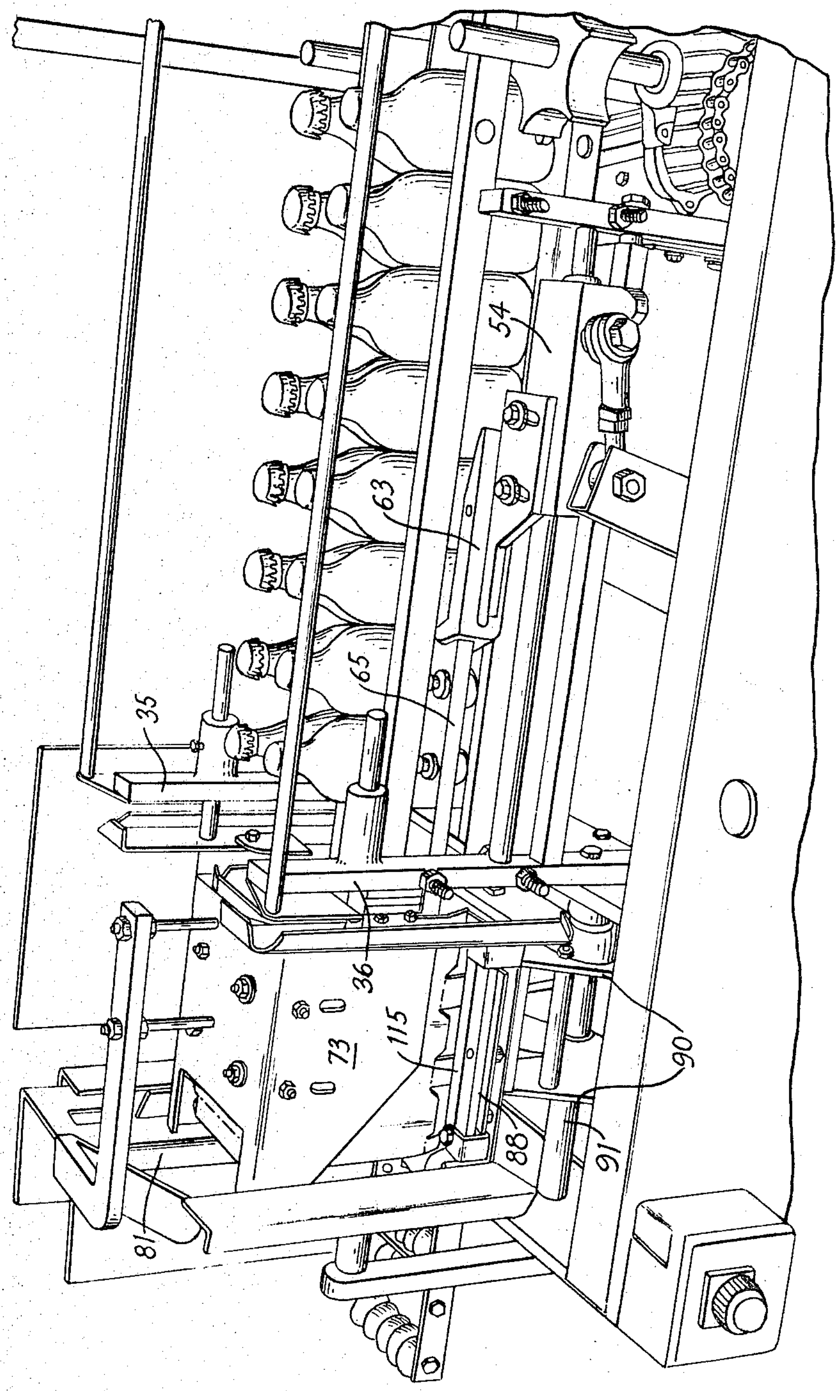

At the moment illustrated in FIG. 2 the pawl 63, and the corresponding pawl on the other side, are pushing a group of six bottles to the left onto the twin plates 40, 41 of the wrapping station 12 thus creating a gap 67 in the line of bottles. The return stroke of the grouping mechanism is illustrated in FIGS. 4, 5 and 6, which also show the gradual advance of the row of bottles by the star wheels (note the position of the leading bottles relatively to posts 35, 36).

Wrapping mechanism

At the end of the grouping or feeding stroke of the pawls 63 the group of six bottles is entirely within the wrapping station and comes to rest there. The tops of the bottles form a support on which the blank B is placed (FIG. 3) by the operator or a blank feeding device, and the blank is properly aligned with the bottle group by a lateral plate 68 and forward and rear stops 69 and 70. The front stops are adjustable at 71, the rear stops at 72.

A folding device is arranged above the wrapping station 12 for the purpose of folding the sides of the blank down the sides of the group of bottles in the station. The folding device has the form of a sheet metal hood 73 bent to the shape of an inverted U. The hood 73 is attached to an arm 74 by studs 75 (FIG. 1). The arm 74 is angled at 76, thus forming a crank arm with respect to a shaft 77 mounted in bearings 78 and 79. A driven arm 80 is secured to the shaft 77 and is movable up and down by means of a push rod 81, the lower end of which is linked at 82 to an oscillating lever 83.

Figure 3:
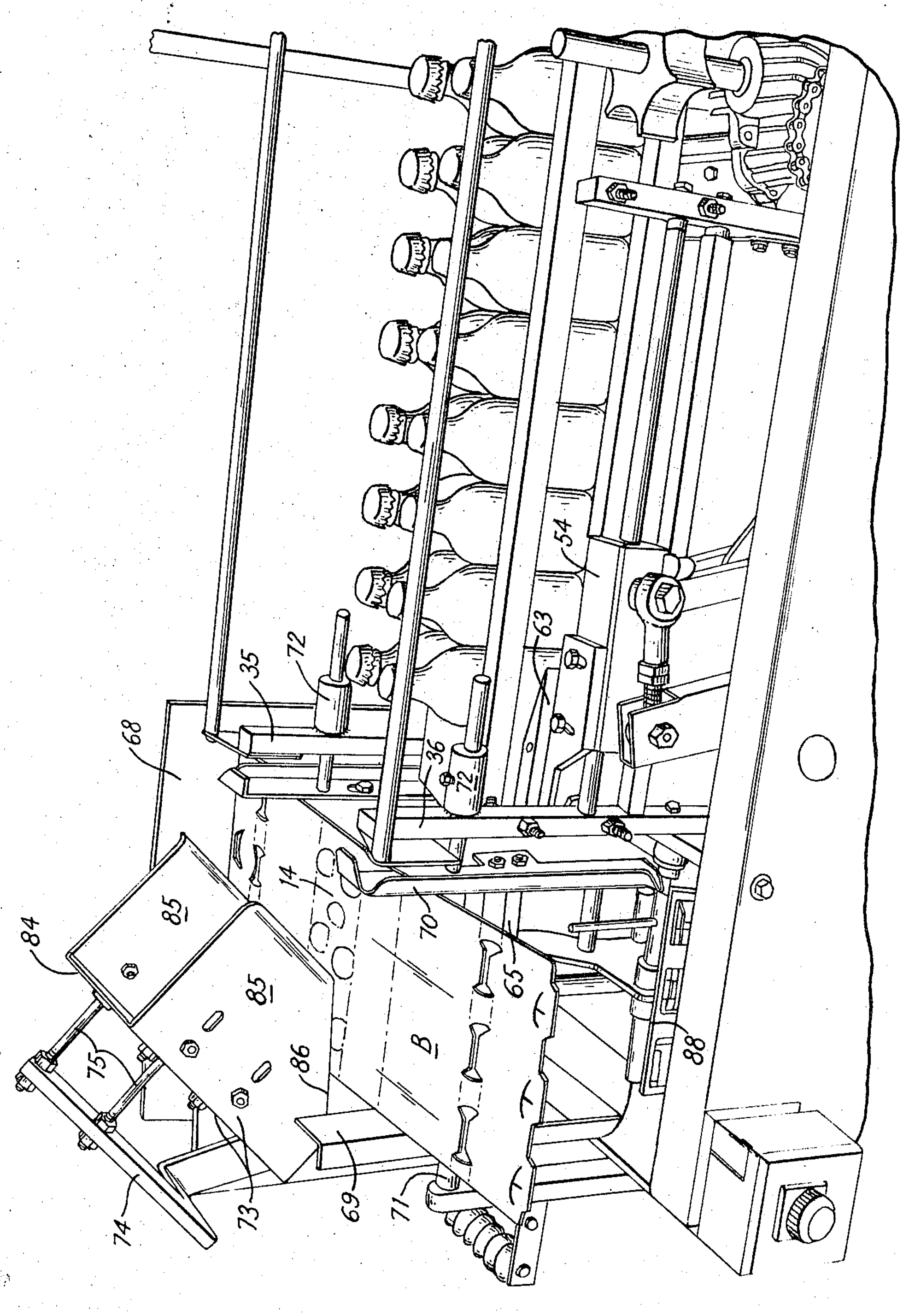
Figure 7:
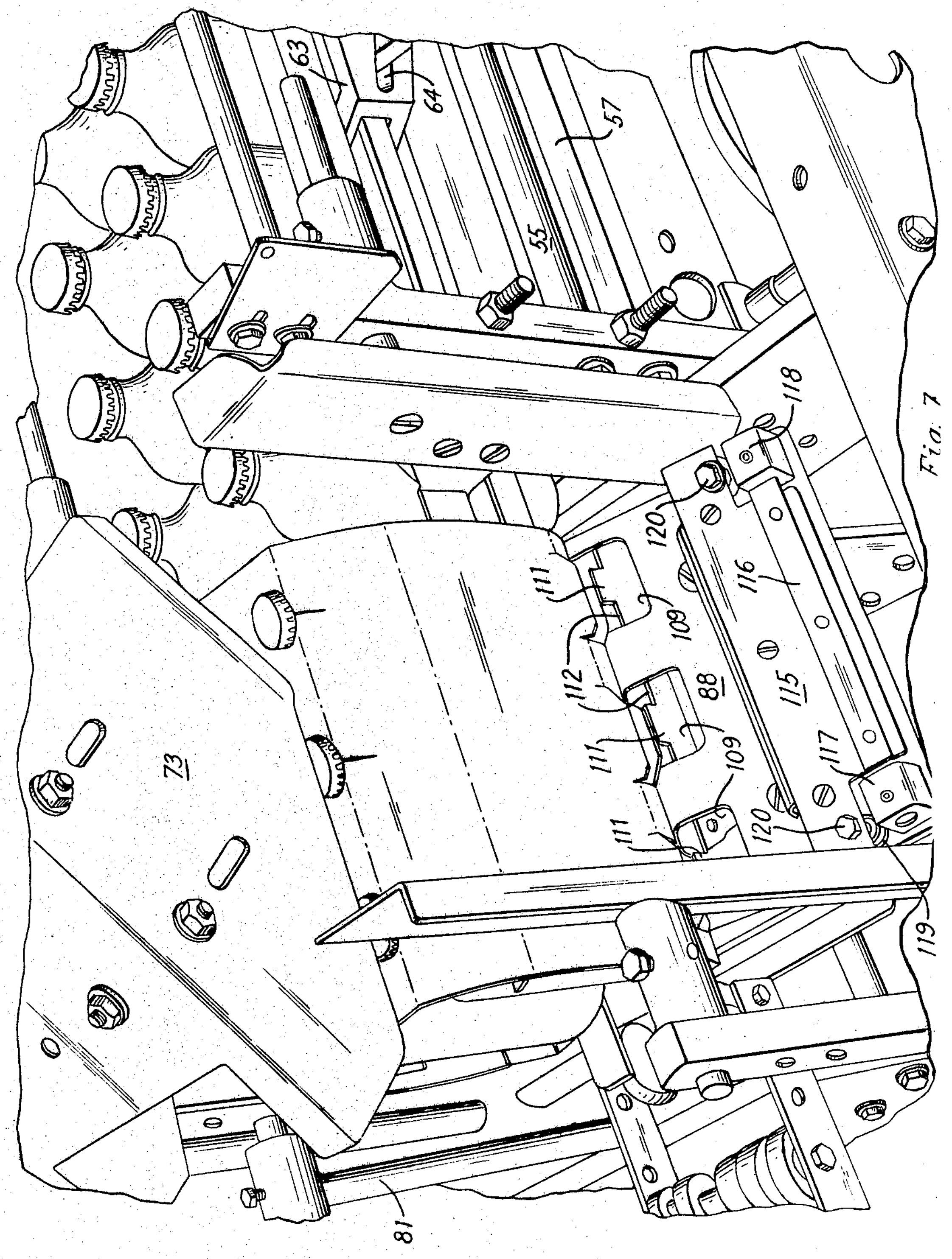
FIG. 7 is a perspective side view on an enlarged scale of the wrapping station of the machine shortly after completion of the locking operation.

The folding hood 73 comprises a top portion 84 and lateral skirt portions 85, the bottom edges of which are angled at 86 to lie substantially parallel to the surface of the blank at the moment the descending hood 73 makes contact with the blank (See FIG. 3 and also FIG. 7).

Downward motion of the folding hood 73 causes the blank B to be folded at the scores which border its top panel 14, with the result that the blank portions to either side of the center panel extend down the sides of the bottle group, and outside the ejector blades 65, 66.

It is next necessary to fold the bottom panels 19 and 20 of the blank under the bottle group (and under the supporting cantilever blades 40, 41 on which the bottles rest).

This is accomplished by oppositely disposed folding blades which are transversely movable with respect to the path of the bottles. FIG. 1 shows these folding blades at 87 and 88 in nearly fully retracted position in which they clear the ends of a blank which is being downfolded by the folding hood 73.

The folding blades 87, 88 are of difference shape and curvature, as will later be described, and are mounted on arms or plates 89, 90 (best seen in FIGS. 2, 6, 12 and 14) on a common shaft 91 mounted in the machine frame at 92. It will be noted in FIG. 2 that an upright push rod 93 extends through the shaft 91 for actuating a lock setting mechanism which will be described later.

Drive cams

Figure 12:
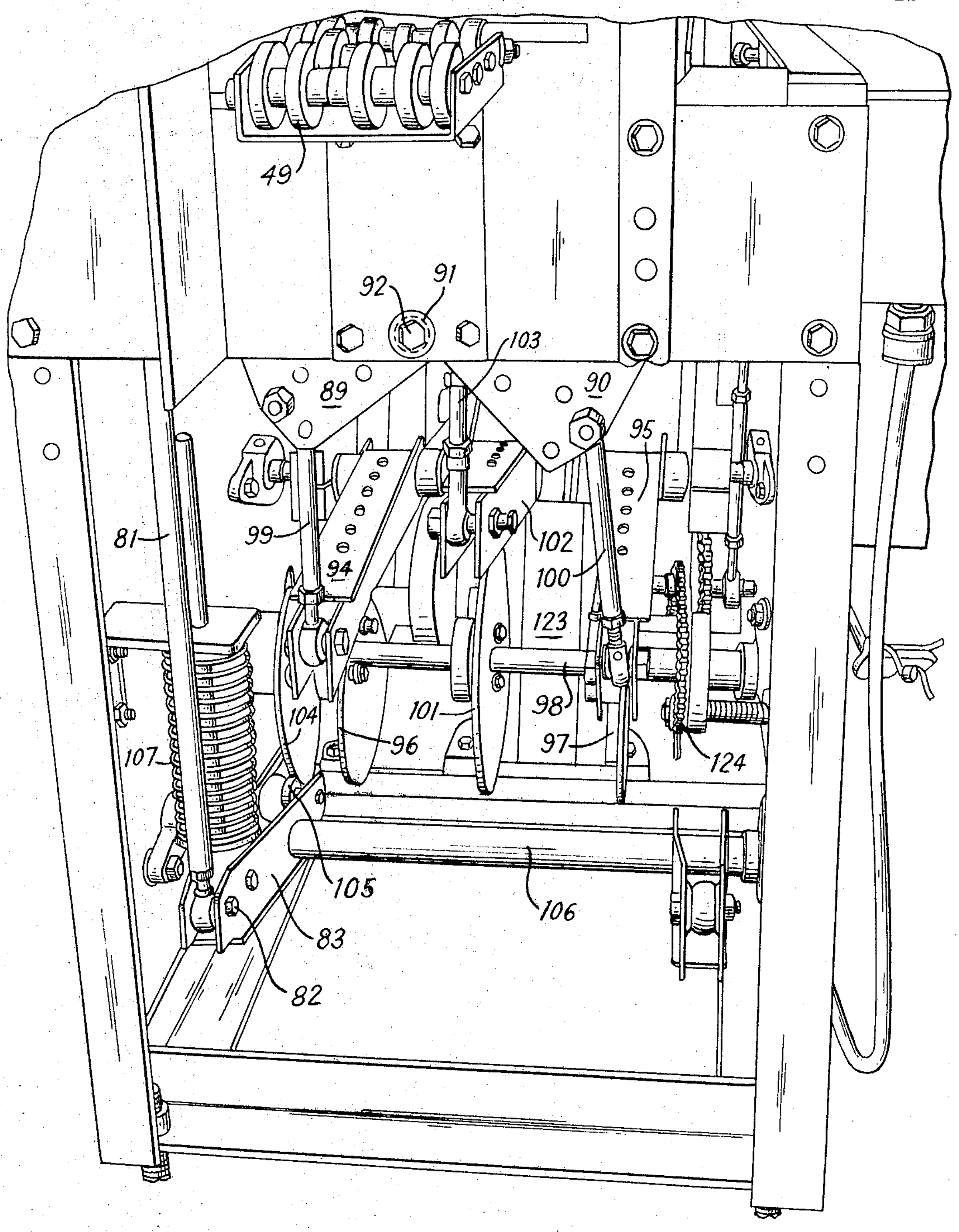
FIG. 12 is a perspective end view of the lower portion of the machine showing portions of the machine drive.

Referring to FIG. 12, the arms 89 and 90 of the folding blades are oscillated by a pair of oscillating arms 94, 95 carrying rollers (not visible) riding on cams 96, 97 mounted on a cam shaft 98. The oscillating arms 94, 95 are connected to the blade carrying arms 89, 90 by connecting rods 99 and 100.

A centrally mounted cam 101 rocks an arm 102 from which a rod 103 extends upwardly to actuate the push rod 93. On the far left a further cam 104 is visible. The cam 104 is fixed on the cam shaft 98 and bears against a roller 105 mounted on the far end of the double-armed lever 83 whose near end operates the push rod 81 for the folding hood 73. The oscillating arm 83 is mounted on a rocking shaft 106 and is biased by a helical spring 107 in a direction to urge the roller 105 against the cam 104.

Folding hood contour

The sheet metal structure of the folding hood 73 perse is well suited for folding a blank about a group of cans. In the illustrated embodiment the internal contour of the hood is modified by contour studs 108 (FIG. 8) which may be constructed as resilient plungers to form the blank into close agreement with the shape of the bottles, thus reducing to a minimum the degree of slack about the necks.

Folding mechanism

Referring to FIGS. 2 and 7 the right folding blade 88 is substantially rectangular and is provided with three apertures 109 just rearward of its folding edge 110 to permit three locking fingers 111 of a locking blade 112 to pass therethrough.

Figure 10:
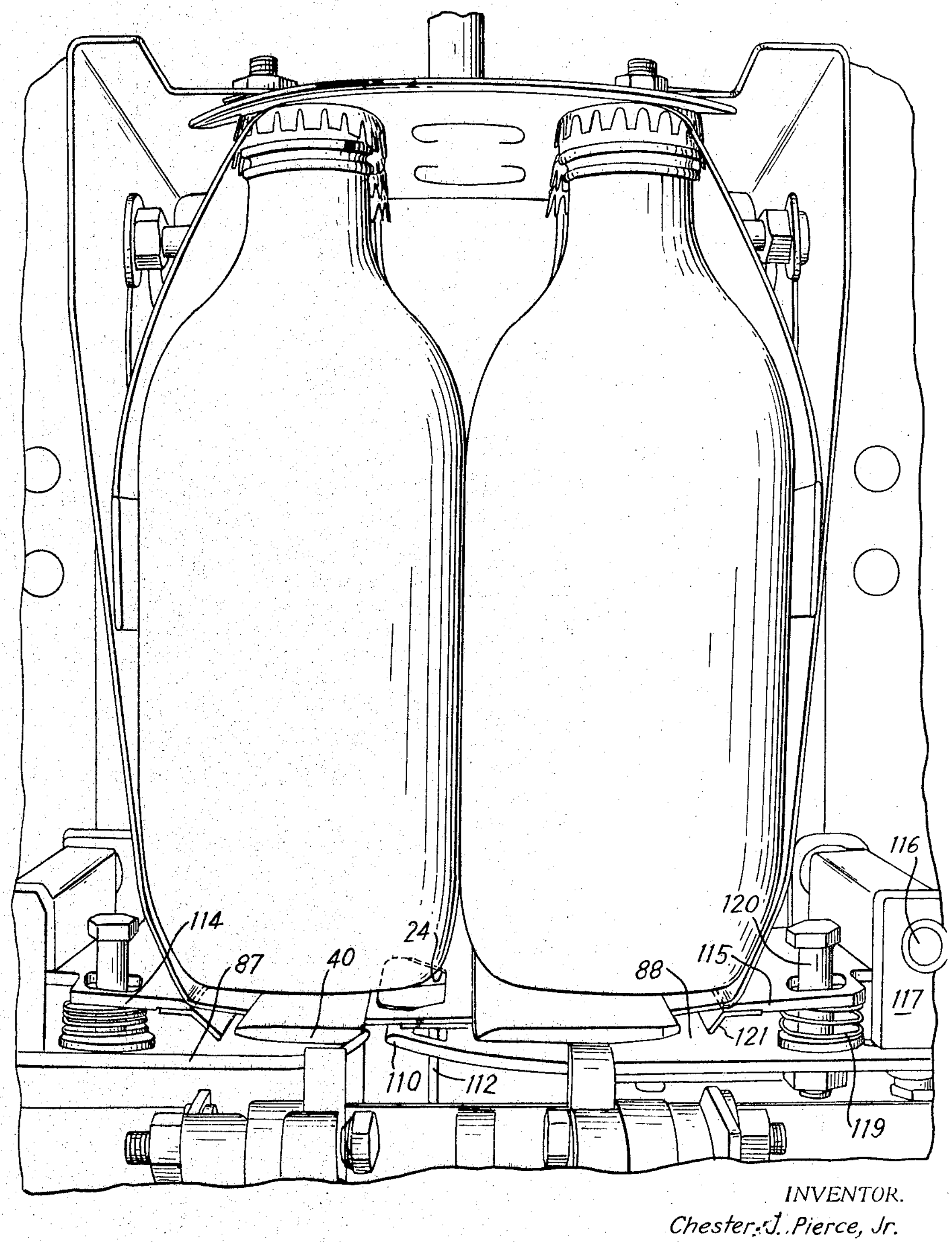

The contour of the blade 88 is best seen in FIG. 10. The blade is slightly curved in an upward direction at its leading edge 110.

Figure 8:
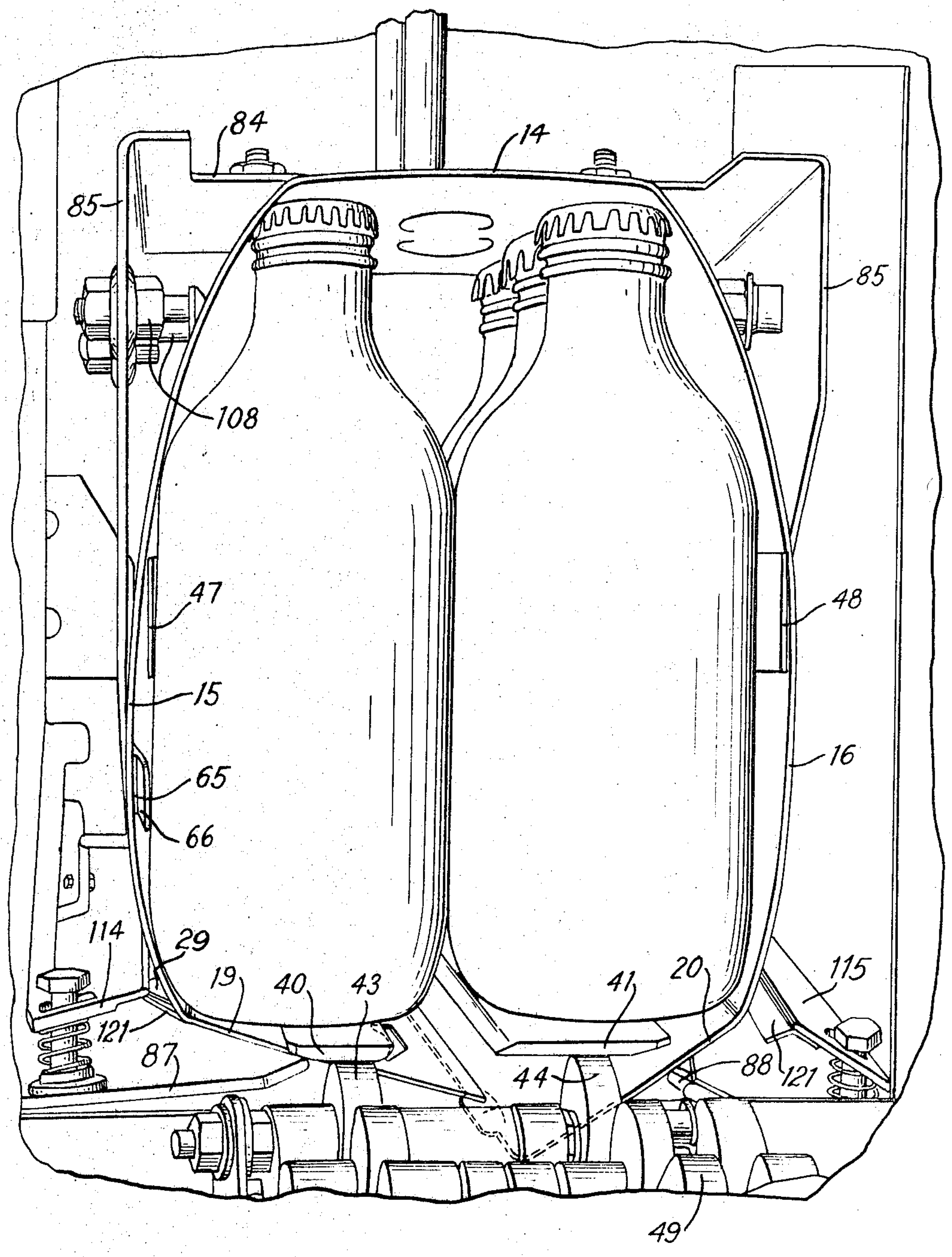
FIGS. 8 to 11 are perspective large scale end views of the machine illustrating, in sequence, the bottom folding, tightening and locking operations performed on the wrap-around sleeve or carrier.

The opposite blade 87 is recessed along its front edge, resulting in the formation of fingers or prongs 113, best seen in FIG. 1, the prongs being curved upwardly, as best seen in FIGS. 8 and 10.

The curvature of the blades 87, 88, together with the shape of the actuating cams 96, 97, is so chosen as to fold up the bottom panel 19 first (FIG. 8) and the panel 20 thereafter in such a manner that its insertion tabs 23 pass through the insertion slots 24 (FIG. 10).

In order to set the tab lock 25, 24 it is necessary first to tighten the blank about the bottle group to a condition of maximum overlap of the bottom panels 19, 20.

Tightening mechanism

For this purpose a sword blade 114, 115 is mounted on each of the folding blades 87, 88 rearwardly of its leading portion so as to engage the side panels of the blank immediately above the outwardly projecting tabs 29 (FIG. 8) which prevent the sword blades from slipping off and insure application of the tightening force substantially in the plane of the bottom panels 19 and 20, combined with a pulling of slack of the entire carrier blank by an initial downwardly directed component of the tightening force.

As is best seen in FIG. 7, the sword blade 115 is pivotally mounted on the folding blade 88 by means of a bar 116 whose ends turn in bearing blocks 117 and 118. The extent to which the blade 88 may tilt upwardly under the action of springs 119 is controlled by bolts 120 which represent upward stops, and its downward tilt is limited by sheet metal legs 121, best seen in FIG. 9, which come to rest on the folding blade, as shown in FIG. 10. The construction of the sword blade 114 corresponds to that of blade 115.

Figure 9:
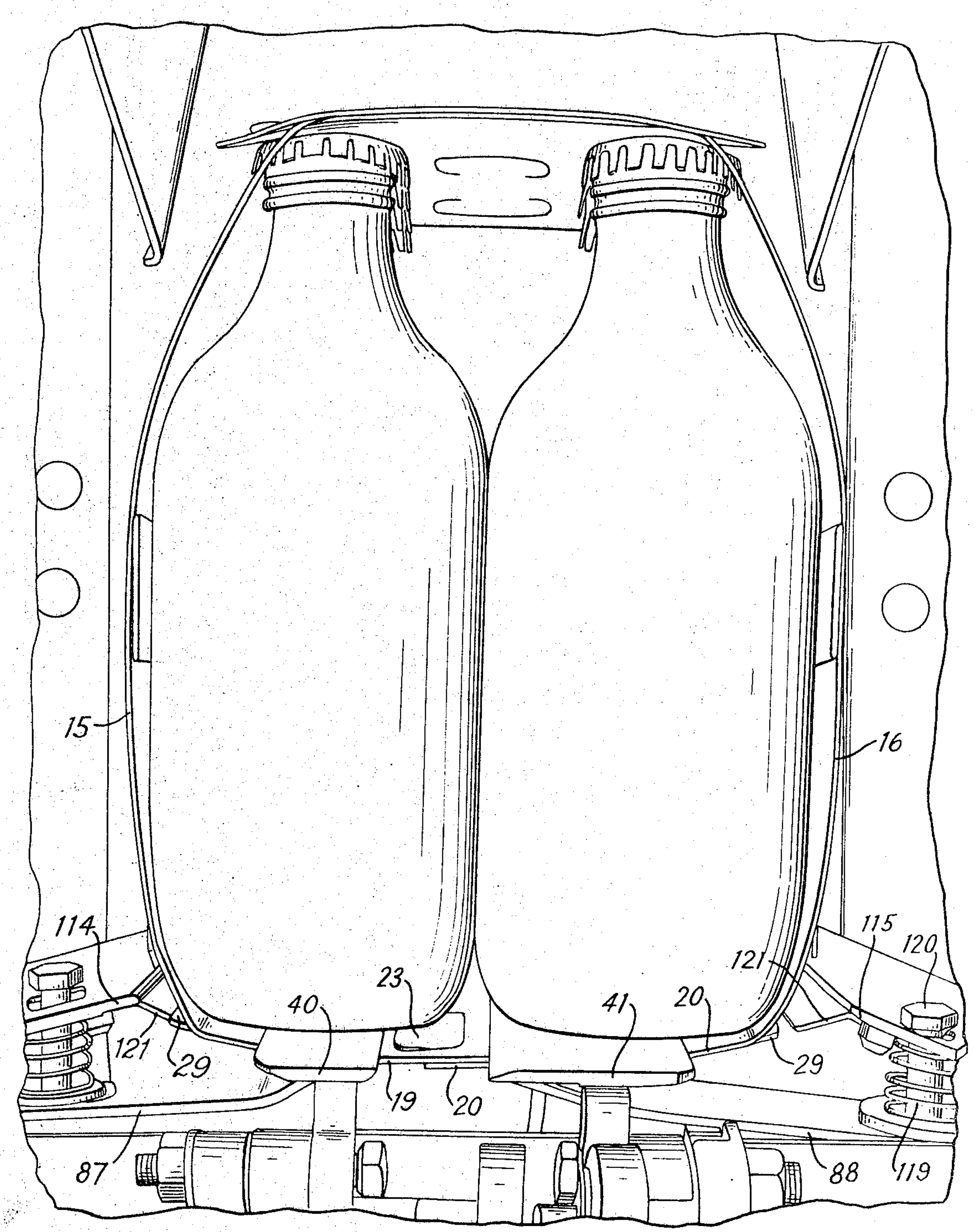

In the position shown in FIG. 9 the sword blades 114 and 115 are uptilted and are about to move into the angular space between the bottom tabs 29 and the side walls 15, 16 of the wrapped blank. In FIG. 10 the tightening of the blank is complete. In this position the blades 114, 115 are downwardly tilted and have entered beneath the bottom rims of the bottles, thus displacing the bottles slightly in an upward direction. This aids in the tightening of the blank.

The bottom panels of the blank are next locked together by pressing the tips of the locking tabs 25 past the straight edge of aperture 24.

Locking

Figure 11:
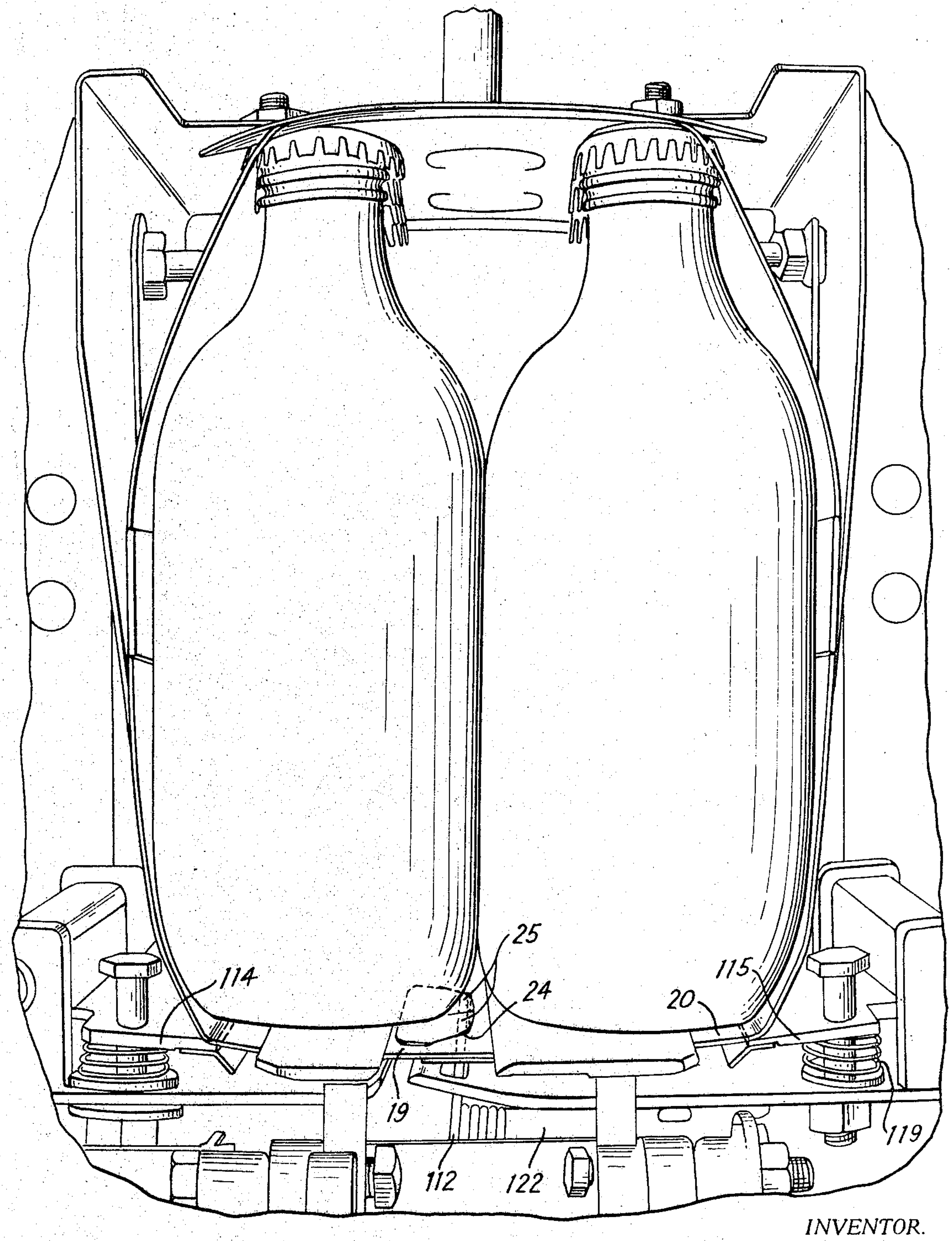
Figure 13:
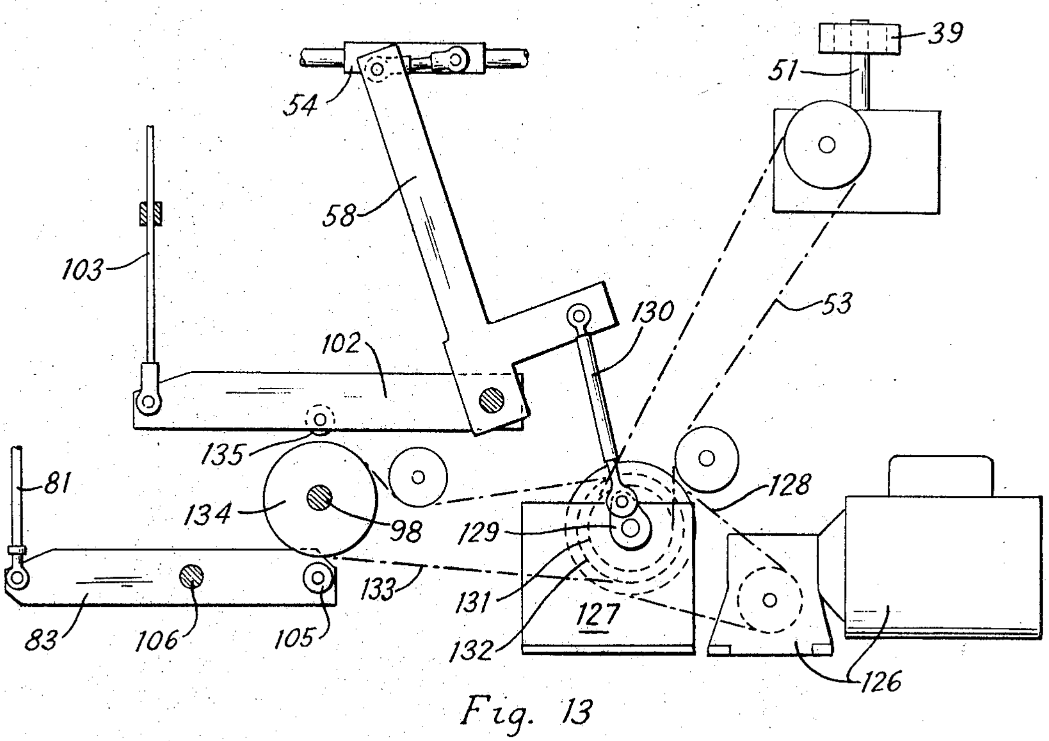
FIG. 13 is a diagram of the drive mechanism.
Figure 14:
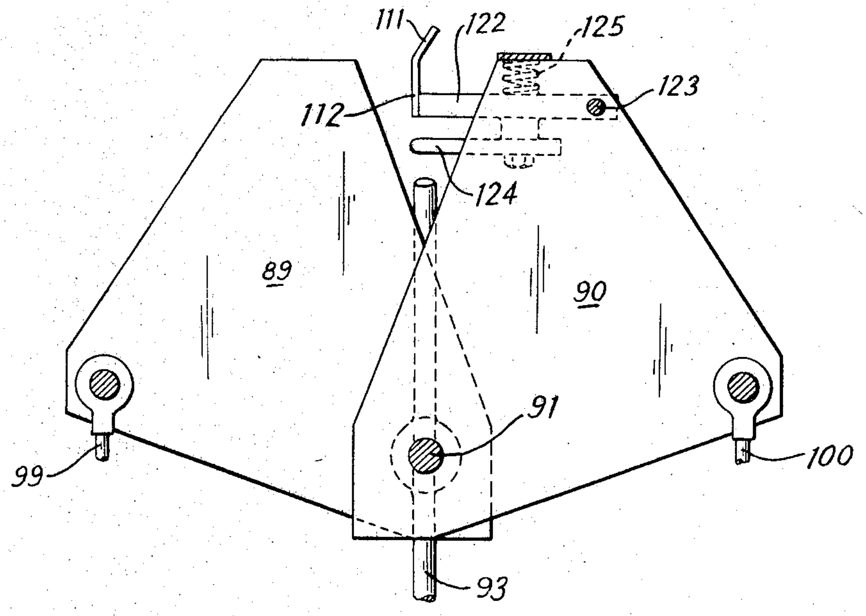
FIG. 14 shows certain details of the locking mechanism which are obscured in FIG. 12.

The locking blade 112 (FIG. 7) is mounted on the end of bars 122 (FIG. 14), the bars 122 being tiltably mounted at 123 on the plate 90 below the folding blade 88. An anvil surface 124 extends at right angles to the locking blade in a position above the push rod 93 to cause the upward motion of the push rod 93 to raise the locking plate 112 against the action of a return spring 125. The fingers 111 push the tips of the locking tabs to a level above the top surface of the bottom panel 19. This condition is shown in FIG. 11. The motion of the push rod 93, as previously mentioned, is generated by its cam 101 and arm 102 (FIGS. 12 and 13).

After the locking fingers are lowered by the spring 125 and the retraction of the push rod 93, the bottle package is completed and is ejected from the wrapping station.

Ejection of package

During the folding and locking operations performed on the bottom structure the ejector blades, one of which is still visible at 65 in FIG. 8, were gradually withdrawn by the rearward motion of the carriage 54 (FIG. 6) until the stepped ends of the blades 65 engage the rearward edge of the wrapper. At this moment the pawl 63 also snaps behind the third bottle of the advancing row of bottles. The moment at which this occurs is slightly later than the moment illustrated in FIG. 6, and the gap 67 (FIG. 2) between the advancing bottles and the package is almost closed.

As the feeder carriage 54 advances, the ejector blades push the completed package out of the wrapping station and a new group of bottles is moved into the station.

As the package leaves the station 12 its bottom structure encounters the rollers 43 and 44 on which the supporting blades 40, 41 rest. The blades 40, 41 are lifted slightly and the bottom structure passes through the gap therebetween.

The completed package is deposited on the roller track 49 and is then transported to a case loading station by any convenient means.

Drive mechanism

A power unit 126 comprising a motor and a reduction gear is connected to a gear box 127 by a chain 128.

The output of the gear box 127 operates the oscillating arm 58 via a crank 129 and link 130. An output gear 131 drives the chain 53 for the star wheel 39, and a further output gear 132 drives the cam shaft 98 through a chain 133. The cam shaft carries a sprocket wheel 134 around which the chain 133 extends. The cams are not shown in FIG. 13 for reasons of simplicity, but cam followers are indicated, for example, at 105. A further cam follower 135 on the arm 102 is a part of the operating means for the locking mechanism, more particularly the push rod 93.

Summary of operation

As the star wheel 39 (FIG. 2) feeds bottles R into the grouping station 11, the start of the operation may be considered the moment at which the carriage 54, after full retraction to the right, grasps a group of bottles with its pawl 63 and pushes them to the left into the wrapping station 12, thereby creating a gap 67 behind the group of bottles which is being diminished by the continuing gradual advance of additional bottles.

The group of bottles comes to rest at the station 12 where a blank B is placed on the tops of the bottles (FIG. 3).

The folding hood swings down and folds the blank down the sides of the bottle group (FIG. 4). Folding blades 87, 88 (FIG. 1) then move against the lower ends of the blank (FIG. 4) and fold them into overlapping position (FIGS. 5 and 6) beneath a pair of plates 40, 41 (FIG. 8) on which the bottles rest. The left bottom panel 19 is folded first and end tabs 23 on the right panel 20 are inserted into apertures 24 in the left panel (FIG. 9).

Sword blades 114, 115 (FIG. 9) then bear against the sides of the blank immediately above the outwardly projecting bottom tabs 29 and tighten the bottom panels to a position of maximum overlap (FIG. 10). In this process the bottles are lifted by the blades 114, 115 entering under the bottom rims of the bottles.

Locking fingers 112 then rise from below (FIG. 11) and push the tips of locking tabs through the apertures.

Ejector blades having stepped ends 66 are withdrawn from between the bottles (FIG. 8) and the blank by the feeder carriage 54 to which they are mounted (FIG. 2), the withdrawal movement being sufficient for the stepped ends to catch on the trailing edge of the completed package which is then pushed out of the wrapping station by the next feed stroke of the carriage 54.

What is claimed is:

1. A device for enclosing a group of receptacles in a bottom locking wrap-around blank of the type comprising a top panel, side wall panels articulated to the top panel and a bottom panel articulated to each of said wall panels along a bottom fold line, said bottom panels having integral tabs thereon which extend beyond the bottom fold line and are cut from the stock of the wall panels by tab-defining cuts forming relief openings in the walls for partial protrusion of the receptacles therethrough, there being an internal locking tab formed in said one bottom panel forceable through an aperture formed in the other bottom panel into locking engagement therewith, the device comprising, in combination, a longitudinally extending cantilever-mounted supporting plate for said group; means for folding a blank placed on top of the group down the sides of the group; a pair of longitudinally extending folding members mounted for transverse movement underneath said supporting plate in a position to engage the bottom panels of a downfolded blank below the bottom fold lines and fold the bottom panels into a centrally overlapping position under the supporting plate; a blade mounted above, and movable with each of said folding members in a position to engage with their edges the side panels immediately above said outwardly extending tabs of the inwardly folded bottom panels along a line of engagement extending across at least one of said relief openings to draw the bottom panels together by such engagement into a position of maximum overlap; and locking means movable in timed relationship with respect to said folding blades from a retracted low posiiton into an elevated position in which the locking means engage said locking tab and force it through said aperture to a level above said other panel.

2. A device according to claim 1 in which said blade is tiltably mounted on the respective folding member, is normally biased in an uptilted sense and is tiltable downwardly against its biasing force upon engagement with the side wall of the blank, the said blade being set to engage the upper surface of the said integral tabs which extend outwardly after infolding of the bottom panels.

3. A device according to claim 1 in which two rollers and two spaced substantially parallel supporting plates are provided for two rows of receptacles, the cantilever ends of the blades resting on said rollers to permit withdrawal of bottom structure of the completed receptacle-plus-blank package between said rollers and supporting plates.

4. A device according to claim 1 in which a pair of ejector blades is provided laterally disposed with respect to, and in contact with, the sides of the receptacles of a group on said supporting plate in a position in which the side panels of the blank are folded over the ejector blades so as to enclose them together with the said group in the folded blank, said blades being substantially horizontally disposed and having stepped forward ends adapted upon rearward withdrawal of the blades to engage the rearward edge of the blank at the step in the blade; and means for moving said ejector blades back and forth in time with said folding blades.

5. A device for enclosing a group of receptacles in a bottom locking wrap-around sleeve of the type comprising a top panel, side wall panels articulated to the top panel and a bottom panel articulated to each of said wall panels along a bottom fold line, said bottom panels having integral tabs thereon which extend beyond the bottom fold line and are cut from the stock of the wall panels by tab-defining cuts forming relief openings in the walls for partial protrusion of the receptacles therethrough, there being an external insertion tab on one of the bottom panels insertable into a slot in the other bottom panel, and an internal locking tab formed in said one bottom panel forceable through an aperture formed in the other bottom panel into locking engagement therewith, the device comprising, in combination, means forming a track on which said receptacles may be advanced in double file to a wrapping station, said track forming means including at said wrapping station a pair of spaced supporting plates, one for each single file of receptacles, each of said plates being mounted to provide a terminal cantilever end; means at the wrapping station for folding a wrapper blank placed on top of a group of receptacles down the sides of the group; a pair of primary folding blades mounted for transverse movement underneath said cantilever end of the plates in a position to engage the bottom panels of a downfolded blank below the bottom fold lines to fold the bottom panels under said cantilever ends towards each other into a position in which said insertion tab enters said slot and the bottom panels overlap centrally; a secondary blade mounted on, and above said primary blade, in a position set back with respect to the bottom-panel-engaging edge of the primary blade for engagement with the side panels immediately above the outwardly extending tabs of the inwardly folded bottom panels to draw the bottom panels together to a position of maximum overlap, the upper surface of the secondary blades being set at a level to engage the receptacles at their bottoms and lift the receptacles relatively to the bottom panels; and locking means movable in timed relationship with respect to said side panel engaging means for engaging the said locking tab from below and forcing it through said aperture into a position overlying the said other panel.

6. A device according to claim 5 in which said track forming means comprises a receptacle grouping zone upstream with respect to said cantilever-ended supporting plates, in which a pair of carriages is mounted for reciprocating movement along opposite sides of the receptacle track, each said carriage being fitted with a ratchet element biased to move past a predetermined number of receptacles during its return stroke and engage behind, and advance said number of receptacles toward the wrapping station during its forward stroke; each said carriage being further fitted with an ejector blade extending along the sides of receptacles, past which the ratchet elements had moved, said ejector blade being in a position to be enclosed by the downfolded wrapper blank, said ejector blades having stepped forward ends adapted to engage, by the respective step, the trailing edge of a folded wrapper blank at the wrapping station, as the carriage moves through its return stroke, so as to eject said folded wrapper blank and the receptacles enclosed therein from the wrapping station during the forward stroke of the carriage.

7. A device for enclosing a group of receptacles in a bottom locking wrap-around sleeve of the type comprising a top panel, side wall panels articulated to the top panel and a bottom panel articulated to each of said wall panels along a bottom fold line, said bottom panels having integral tabs thereon which extend beyond the bottom fold line and are cut from the stock of the wall panels by tab-defining cuts forming relief openings in the walls for partial protrusion of the receptacles therethrough, there being an external insertion tab on one of the bottom panels insertable into a slot in the other bottom panel, and an internal locking tab formed in said one bottom panel forceable through an aperture formed in the other bottom panel into locking engagement therewith, the device comprising, in combination, means forming a track on which said receptacles may be advanced in double file to a wrapping station, said track forming means including, at said wrapping station, a pair of spaced supporting plates, one for each single file of receptacles, each of said plates being mounted to provide a terminal cantilever end; means at the wrapping station for folding a wrapper blank placed on top of a group of receptacles down the sides of the group; a pair of folding blades mounted for transverse movement underneath said cantilever end of the plates in a position to engage the bottom panels of a downfolded blank below the bottom fold lines to fold the bottom panels under said cantilever ends towards each other into a position in which said insertion tab enters said slot and the bottom panels overlap centrally, a secondary blade mounted on each of said folding blades in a position set back with respect to the bottom-panel-engaging edge thereof and with freedom to tilt about a horizontal axis relatively to the folding blade in a position in which the edge of the secondary blade engages the upper surface of the said integral tabs and bears against the downfolded side panels immediately above said tabs to tighten the blank about said group to a position of maximum overlap; a locking element mounted for joint transverse movement with one of said folding blades and with freedom of vertical movement with respect thereto, said locking element being in a position to engage the locking tab in said one bottom panel and force it through the aperture in the other overlapping bottom panel.

8. A device for enclosing a group of receptacles in a bottom locking wrap-around blank in which a blank is placed on top of the group, the sides of the blank being folded down the sides of the group and the blank ends are folded into overlapping position below the group, whereafter the blank is tightened about the group and its ends are interconnected, and in which the blank tightening means are in the form of a pair of substantially parallel blades which grasp the folded blank immediately above the plane of the overlapped blank ends at which location relief opening are provided in the sides of the blank, into which openings the blades are insertable, the improvement which comprises means for moving said blades away from, and toward, each other into a position of closest spacing in which position the upper surface of the blades is downwordly tilted towards the bottles, engages the bottoms of the receptacles through said relief apertures and raises the receptacles relatively to the underlying blank ends.

9. In the method of enclosing a group of receptacles in a bottom-locking wrap-around blank of paperboard of the type in which laterally outwardly extending tabs are formed on the bottom panels which tabs result in the formation of lateral relief openings through which the enclosed receptacles may project, and in which locking tabs are formed in one bottom panel which are insertable in appropriate locking apertures in the other bottom panel with which the one panel overlaps, the steps of tightening the blank around the group of receptacles by application of a force against the side walls along a line of application immediately above said tabs and simultaneously lifting said receptacles relatively to said bottom panels by application of a lifting force against the receptacle bottoms prior to insertion of the locking tabs into the locking apertures.

References Cited

UNITED STATES PATENTS

| | | | |
|---|---|---|---|
| 3,070,928 | 1/1963 | Ganz | 53—48 |
| 3,197,937 | 8/1965 | Ganz | 53—48 |
| 3,456,420 | 7/1969 | Ganz | 53—48X |

THERON E. CONDON, Primary Examiner

N. ABRAMS, Assistant Examiner

U.S. Cl. X.R.

53—32